United States Patent
Huang et al.

(10) Patent No.: US 8,909,986 B2
(45) Date of Patent: Dec. 9, 2014

(54) DATA STORING METHOD FOR SOLID STATE DRIVE TO PRESERVE DATA INTEGRITY AFTER POWER FAILURE

(75) Inventors: Chih-Wei Huang, Hsinchu (TW); Gang-Ming Fan, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 203 days.

(21) Appl. No.: 13/610,014

(22) Filed: Sep. 11, 2012

(65) Prior Publication Data
US 2013/0151892 A1    Jun. 13, 2013

(30) Foreign Application Priority Data
Dec. 8, 2011  (CN) .......................... 2011 1 0406260

(51) Int. Cl.
*G06F 11/00*    (2006.01)

(52) U.S. Cl.
USPC ......................................... 714/6.32

(58) Field of Classification Search
CPC ................................................. G06F 12/0246
See application file for complete search history.

(56) References Cited

U.S. PATENT DOCUMENTS

| | | | | |
|---|---|---|---|---|
| 5,581,723 | A * | 12/1996 | Hasbun et al. | 711/103 |
| 6,393,513 | B2 * | 5/2002 | Estakhri et al. | 711/103 |
| 7,178,061 | B2 * | 2/2007 | Aasheim et al. | 714/24 |
| 7,904,635 | B2 * | 3/2011 | Deng et al. | 711/103 |
| 2004/0078666 | A1 * | 4/2004 | Aasheim et al. | 714/24 |
| 2010/0169543 | A1 * | 7/2010 | Edgington et al. | 711/103 |
| 2012/0297258 | A1 * | 11/2012 | Flynn et al. | 714/710 |

* cited by examiner

*Primary Examiner* — Christopher McCarthy
(74) *Attorney, Agent, or Firm* — WPAT, PC; Justin King (57) ABSTRACT

A data storing method for a solid state drive is used to preserve data integrity after a power failure. The solid state drive has a flash memory with plural blocks. Each block includes plural pages. One of the plural blocks is set as an old open block. The data storing method includes the following steps. Firstly, the solid state drive is powered on again. Then, the valid data in the old open block are stored into a new open block.

7 Claims, 6 Drawing Sheets

DATA STORING METHOD FOR SOLID STATE DRIVE TO PRESERVE DATA INTEGRITY AFTER POWER FAILURE

This application claims the benefit of People's Republic of China Application Serial No. 201110406260.5, filed Dec. 8, 2011, the subject matter of which is incorporated herein by reference.

FIELD OF THE INVENTION

The present invention relates to a data storing method for a solid state drive, and more particularly to a data storing method for a solid state drive in order to preserve the data integrity after an unexpected power failure.

BACKGROUND OF THE INVENTION

As is well known, a solid state drive (SSD) is a data storage device that uses a NAND-based flash memory to store data. The NAND-based flash memory is a non-volatile memory. After data are written to the flash memory, if no power is supplied to the flash memory, the data are still retained in the flash memory.

Depending on the designed configurations, the NAND-based flash memories may be classified into three types, i.e. a single-level cell (SLC) flash memory, a multi-level cell (MLC) flash memory and a triple-level cell (TLC) flash memory.

The SLC flash memory has a faster accessing speed, higher cost, and a larger number of erase cycles (e.g. about several ten thousands of erase cycles). However, the SLC flash memory can store only one bit of data per cell. The TLC flash memory has a slower accessing speed, lower cost, and less number of erase cycles (e.g. lower than one thousand erase cycles). However, the TLC flash memory can store three bits of data per cell. The MLC flash memory has the intermediate properties between the SLC flash memory and the TLC flash memory. The accessing speed and the cost of the MLC flash memory are lower than the SLC flash memory but higher than the TLC flash memory. Generally, the MLC flash memory has one thousand to five thousand erase cycles, and stores two bits of data per cell. In other words, if the cell numbers are identical, the TLC flash memory has the largest capacity, and the SLC flash memory has the smallest capacity.

Figure 1:
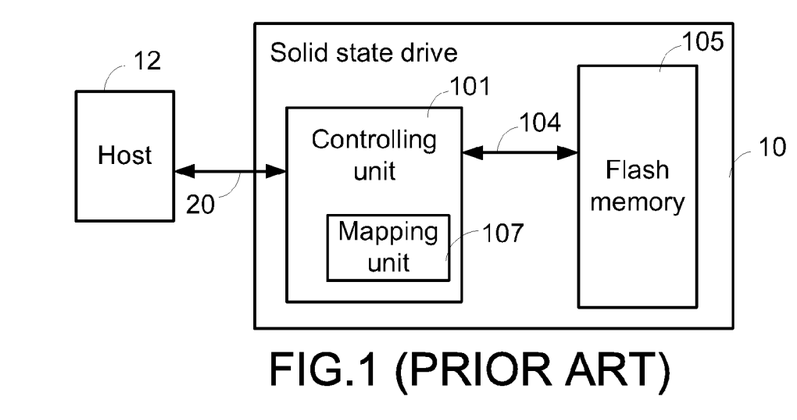
FIG. 1 (prior art) is a schematic functional block diagram illustrating a conventional solid state drive.

FIG. 1 is a schematic functional block diagram illustrating a conventional solid state drive. As shown in FIG. 1, the solid state drive 10 comprises a controlling unit 101 and a flash memory 105. The flash memory 105 is accessible by the controlling unit 101 through an internal bus 104. In addition, the controlling unit 101 is in communication with a host 12 through an external bus 20. Consequently, commands and data can be exchanged between the controlling unit 101 and the host 12. Generally, the external bus 20 is a USB bus, an IEEE 1394 bus, an SATA bus, or the like. The flash memory 105 is for example a SLC flash memory, a MLC flash memory or a TLC flash memory.

Moreover, the controlling unit 101 comprises a mapping unit 107 for managing the data within the flash memory 105. The mapping unit 107 is, for example, a static random access memory (SRAM) or a dynamic random access memory (DRAM). The mapping unit 107 at least comprises one logical-to-physical table (L2P table) and a bitmap table. In the L2P table, the relationships between the logical allocation addresses (LAA) from the host 12 and the physical allocation addresses (PAA) of the flash memory 105 are recorded. The

2 bitmap table records whether the data in each page of the flash memory 105 is a valid data or an invalid data.

However, if the solid state drive 10 is powered off, the data in the L2P table and the bitmap table of the mapping unit 107 will be deleted. Once the solid state drive 10 is powered on again, the L2P table and the bitmap table should be reconstructed by the controlling unit 101, so that the solid state drive 10 can be normally operated.

Generally, the flash memory 105 comprises plural blocks. Each block comprises plural pages (or sectors), for example 64 pages. Each page is typically 4K bytes in size. Due to the inherent properties of the flash memory 105, at least one page is written at a time during the writing operation is performed, and the erasing operation is performed in a block-wise fashion.

Due to the inherent properties of the flash memory 105, if the data of a specified page of a block needs to be corrected, the controlling unit 101 cannot directly correct the data of the specified page. Whereas, the data to be corrected is written into another blank page by the controlling unit 101. Under this circumstance, the specified (old) page is considered as an invalid page, and the data contained therein is considered as an invalid data. Moreover, after many times of accessing actions by the host 12, the flash memory 105 may contain a great number of invalid pages and invalid data, which occupy a lot of space of the flash memory 105. For effectively managing the data of each block, a garbage collection process is provided. The garbage collection process is a process of collecting valid data of each block and rewriting the valid data into another block.

Hereinafter, a conventional data storing method for the flash memory will be illustrated with reference to FIGS. 2A~2F.

Figure 2A:
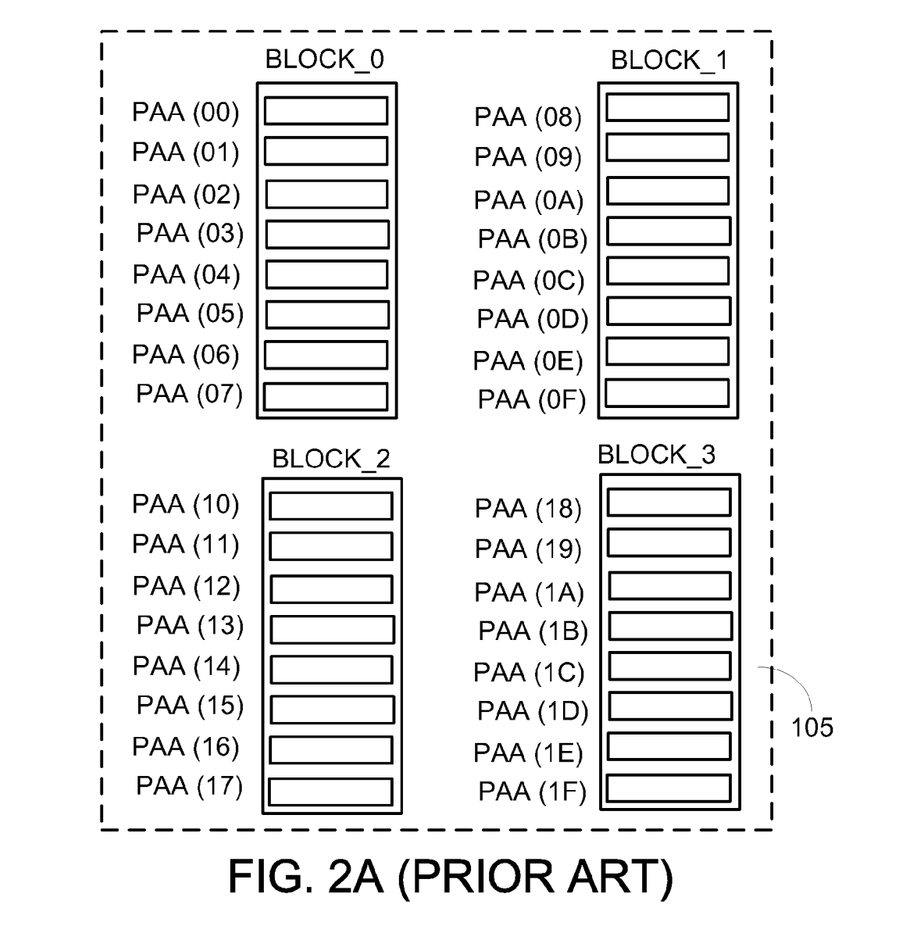
FIGS. 2A~2F (prior art) schematically illustrate the actions of a conventional data storing method for a flash memory of a solid state drive.

As shown in FIG. 2A, it is assumed that the flash memory 105 has four blocks (BLOCK_0~BLOCK_3). Each block has eight pages. Each page corresponds to a physical allocation address (PAA). The four blocks as shown in FIG. 2A are all blank blocks. The physical allocation addresses of the zero-th block BLOCK_0 are PAA(00)~PAA(07). The physical allocation addresses of the first block BLOCK_1 are PAA(08)~PAA(0F). The physical allocation addresses of the second block BLOCK_2 are PAA(10)~PAA(17). The physical allocation addresses of the third block BLOCK_3 are PAA(18)~PAA(1F). Moreover, one of the blocks (e.g. the first block BLOCK_1) may be set as an open block by the controlling unit 101, and the data can be written into the open block.

Figure 2B:
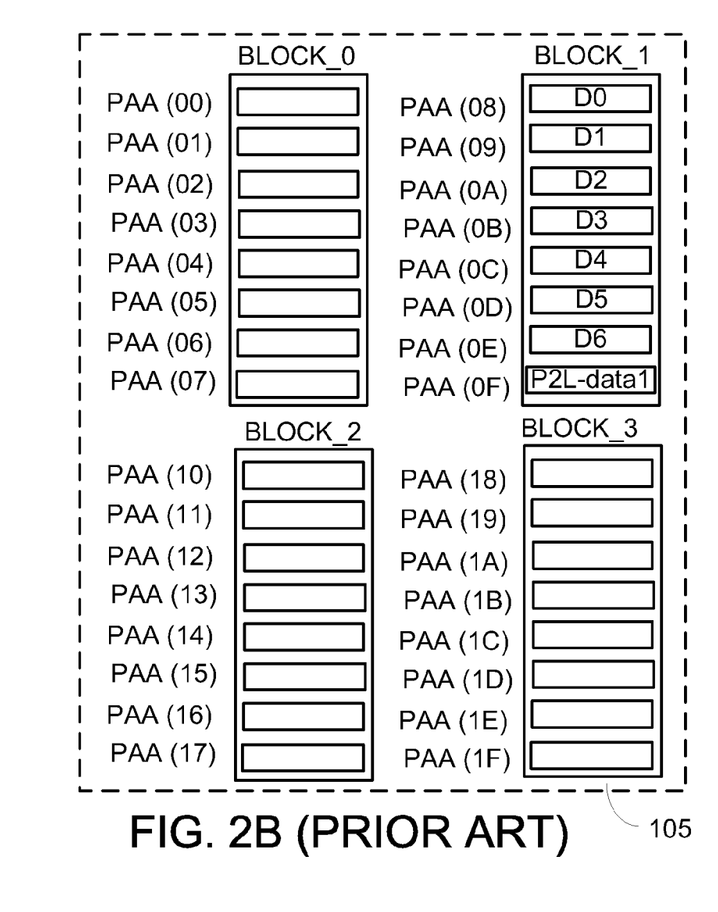

As shown in FIG. 2B, if the host 12 issues seven logical allocation addresses (LAA) and corresponding write data (D0~D6) to the flash memory 105, these data are sequentially written into the first block BLOCK_1 by the controlling unit 101. In addition, the last page of the first block BLOCK_1 is retained by the controlling unit 101, and all physical-to-logical data of the first block BLOCK_1 (i.e. the P2L-data1 of the first block BLOCK_1) are filled into the last page. Then, the first block BLOCK_1 is set as a close block. Then, another block (e.g. the second block BLOCK_2) is set as an open clock. In other words, the close block is the block where the writing operation has been completed.

Figure 2C:
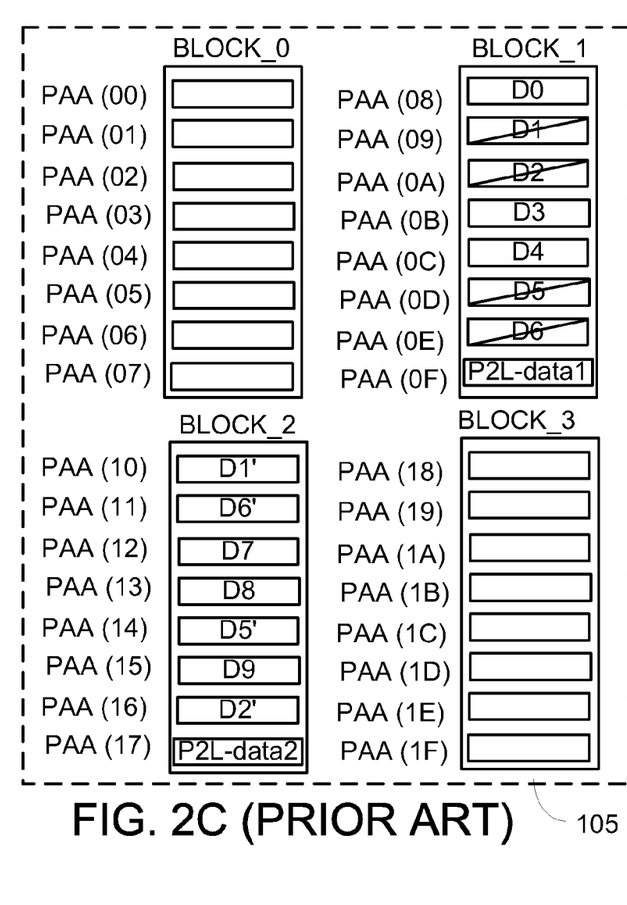

As shown in FIG. 2C, the host 12 issues seven logical allocation addresses and corresponding write data (D1', D6', D7, D8, D5', D9, D2') to the flash memory 105. The data D1, D6, D5 and D2 in the first block BLOCK_1 are replaced by the data D1', D6', D5' and D2', respectively. These data are sequentially written into the second block BLOCK_2 by the controlling unit 101. Moreover, the data D1, D6, D5 and D2 in PAA(09), PAA(0A), PAA(0D) and PAA(0E) of the first block BLOCK_1 are set as invalid data, which are indicated as oblique lines. In addition, the last page of the second block BLOCK_2 is retained by the controlling unit 101, and all physical-to-logical data of the second block BLOCK_2 (i.e. the P2L-data2 of the second block BLOCK_2) are filled into the last page. Then, the second block BLOCK_2 is set as a close block. Then, another block (e.g. the zero-th block BLOCK_0) is set as an open clock.

Figure 2D:
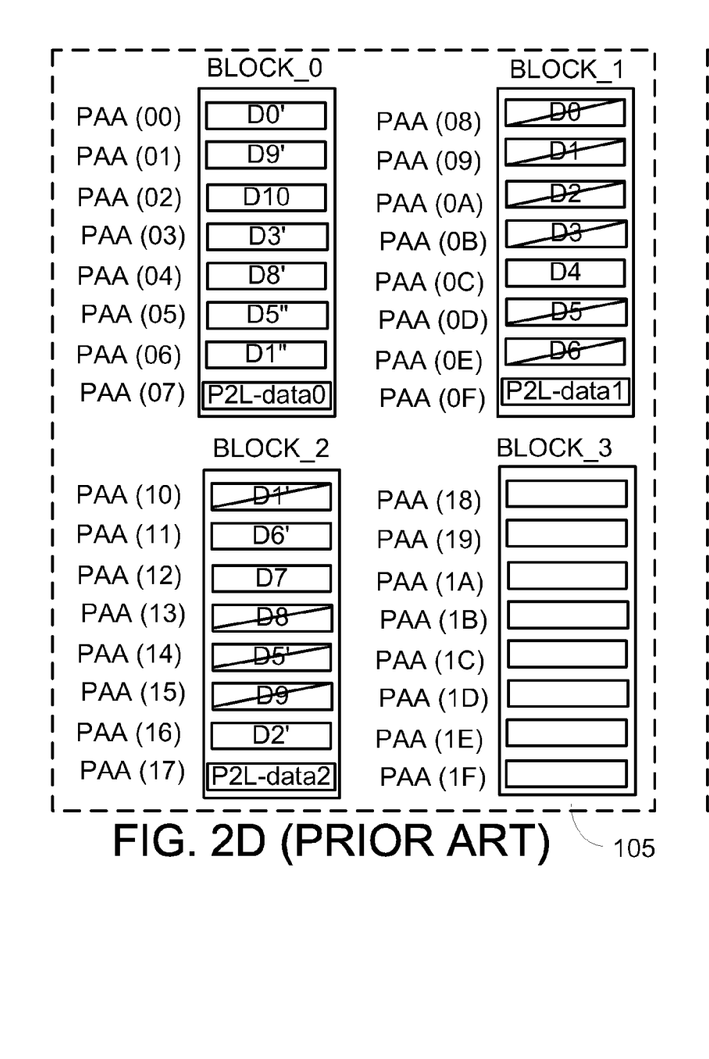

As shown in FIG. 2D, the host 12 issues seven logical allocation addresses and corresponding write data (D0', D9', D10, D3', D8', D5", D1") to the flash memory 105. The data D0 and D3 in the first block BLOCK_1 are replaced by the data D0' and D3', respectively. The data D9, D8, D5' and D1' in the second block BLOCK_2 are replaced by the data D9', D8', D5" and D1", respectively. These data are sequentially written into the zero-th block BLOCK_0 by the controlling unit 101. Moreover, the data D0 and D3 in PAA(08) and PAA(0B) of the first block BLOCK_1 are set as invalid data, and the data D1', D8, D5' and D9 in PAA(10), PAA(13), PAA(14) and PAA(15) of the second block BLOCK_2 are set as invalid data. In addition, the last page of the zero-th block BLOCK_0 is retained by the controlling unit 101, and all physical-to-logical data of the zero-th block BLOCK_0 (i.e. the P2L-data0 of the zero-th block BLOCK_0) are filled into the last page. Then, the zero-th block BLOCK_0 is set as a close block. Then, another block (e.g. the third block BLOCK_3) is set as an open clock.

From the above discussions in FIGS. 2A~2D, after many times of accessing actions by the host 12, the flash memory 105 may contain a great number of invalid data. Since the space of the flash memory is occupied by the invalid data, the writable space of the flash memory is gradually reduced. For solving the above drawbacks, the controlling unit 101 may perform a garbage collection process at a proper time. The garbage collection process is used for collecting valid data of each block and rewriting the valid data into another block. Generally, the garbage collection process is performed during the time that there is no accessing action between the host 12 and the solid state drive 10. If the garbage collection process is performed during the data accessing action, the performance of the solid state drive 10 will be deteriorated.

Figure 2E:
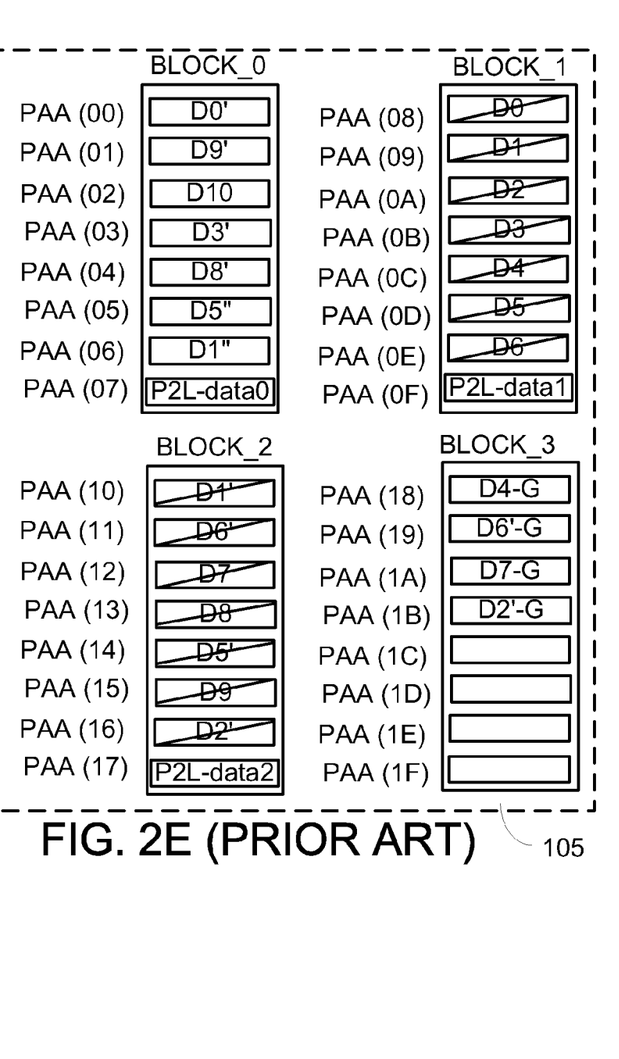

After the garbage collection process is performed, as shown in FIG. 2E, the valid data D4 in PAA(0C) of the first block BLOCK_1 is stored and forwarded to the open block (i.e. the third block BLOCK_3). In other words, after the garbage collection process is performed, the data D4 is moved to the PAA(18) of the third block BLOCK_3, and denoted as the data D4-G. Meanwhile, the data D4 in PAA(0C) of the first block BLOCK_1 is set as the invalid data.

Similarly, after the garbage collection process is performed, the valid data D6', D7 and D2' in PAA(11), PAA(12) and PAA(16) of the second block BLOCK_2 are stored and forwarded to the open block (i.e. the third block BLOCK_3). In other words, after the garbage collection process is performed, the data D6', D7 and D2' are respectively moved to PAA(19), PAA(1A) and PAA(1B) of the third block BLOCK_3, and denoted as the data D6'-G, D7-G and D2'-G. Meanwhile, the valid data D6', D7 and D2' in PAA(11), PAA(12) and PAA(16) of the second block BLOCK_2 are set as the invalid data.

Obviously, after the garbage collection process is performed, no valid data are included in PAA(08)~PAA(0E) of the first block BLOCK_1 and PAA(10)~PAA(16) of the second block BLOCK_2. In addition, the data P2L-data1 in PAA(0F) and the data P2L-data2 in PAA(17) are not available. Consequently, the first block BLOCK_1 and the second block BLOCK_2 may be erased as the blank blocks at any time by the controlling unit 101.

Figure 2F:
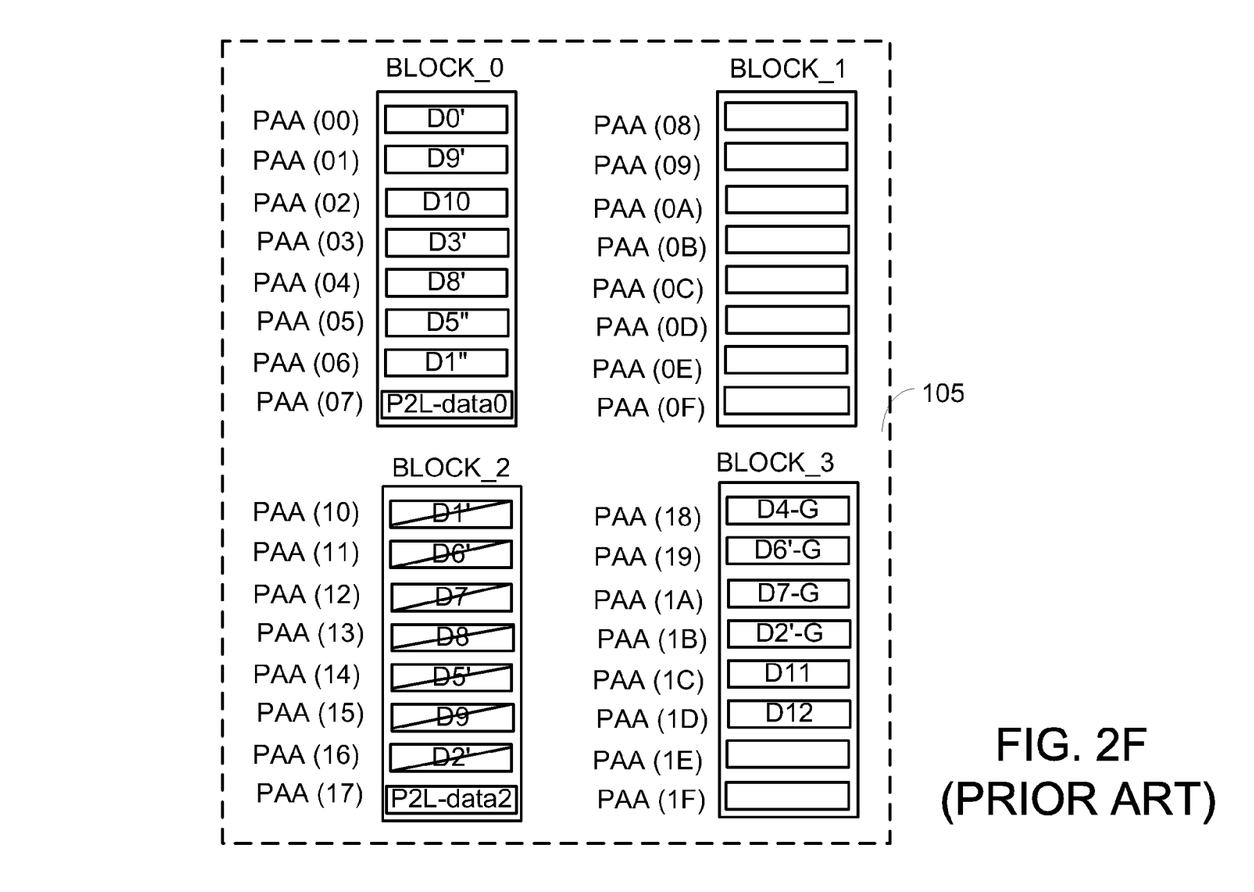

For example, as shown in FIG. 2F, the first block BLOCK_1 is erased as the blank block by the controlling unit 101 after the garbage collection process is performed. Then, the host 12 issues two logical allocation addresses and corresponding write data (D11, D12) to the flash memory 105. These data are sequentially written into the third block BLOCK_3 by the controlling unit 101.

Since the solid state drive 10 has the plug-and-play function, the solid state drive 10 is frequently suffered from an unexpected power failure. For example, if the solid state drive 10 is carelessly touched by the user, the external bus 20 is detached from the host 12 or the solid state drive 10, so that the solid state drive 10 is suffered from the unexpected power failure. Otherwise, if the user misunderstands that there is no accessing action between the host 12 and the solid state drive 10, the user may unplug the solid state drive 10 from the host 12. Under this circumstance, the solid state drive 10 is also suffered from the unexpected power failure.

Take the solid state drive 10 with the MLC flash memory or the TLC flash memory for example. When a data is being written into a specified page of a specified block, if the solid state drive 10 is suffered from an unexpected power failure, the data in the specified block is damaged and even the data in other pages are possibly damaged. Otherwise, after the solid state drive 10 is powered on again, all data in the specified block are gradually damaged or lost.

Therefore, there is a need of providing a method for preserving data integrity after the power failure.

SUMMARY OF THE INVENTION

An embodiment of the present invention provides a data storing method for a solid state drive to preserve data integrity after a power failure. The solid state drive has a flash memory with plural blocks. Each block includes plural pages. One of the plural blocks is set as an old open block. The data storing method includes the following steps. Firstly, the solid state drive is powered on again. Then, the valid data in the old open block are stored into a new open block.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a data storing method for a solid state drive in order to preserve data integrity after a power failure. For implementing the data storing method, the operations of the controlling unit 101 are modified without the need of changing the circuitry architecture of the solid state drive. The architecture of the solid state drive used in the present invention is similar to that of the solid state drive of FIG. 1, and is not redundantly described herein.

Before the process of writing data into the flash memory 105, it is necessary to set an open block by the controlling unit 101. Meanwhile, only the open block can be employed to store data. After the space of the open block has been completely stored, the open block is set as a close block by the controlling unit 101, and another available block is set an open block. In other words, if the solid state drive 10 is suffered from an unexpected power failure, only the open block is affected by the power failure, but the close blocks are not affected by the power failure.

In accordance with the present invention, after the solid state drive 10 is powered on again, the controlling unit 101 should preserve the data integrity of the open block in order to prevent the data of the open block from being damaged or lost. Consequently, after the solid state drive 10 is powered on again, all valid data in the open block should be stored into a new open block. Some embodiments of a data storing method for preserving data integrity after a power failure will be illustrated in more details as follows.

Figure 3A:
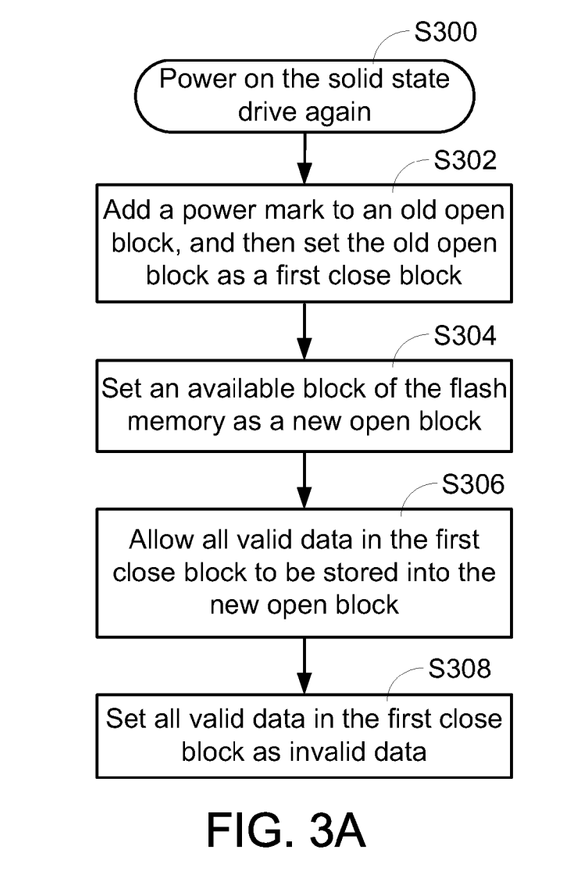
FIG. 3A is a schematic flowchart illustrating a data storing method according to a first embodiment of the present invention.

FIG. 3A is a schematic flowchart illustrating a data storing method according to a first embodiment of the present invention. Firstly, the solid state drive 10 is powered on again (Step S300). Then, a power mark PM is added to the old open block, and the old open block is set as a first close block (Step S302). Then, an available block of the flash memory 105 is set as a new open block (Step S304). Then, all valid data in the first close block are written into the new open block (Step S306). Then, all valid data in the first close block are set as invalid data (Step S308).

Figure 3B:
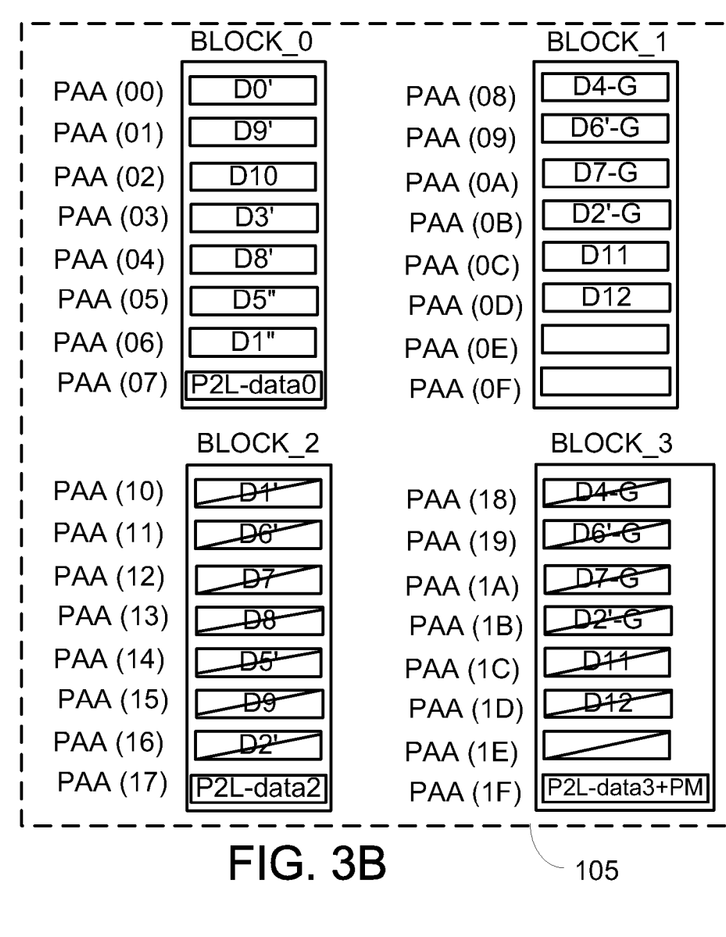
FIG. 3B schematically illustrates the operations of the L2P table by the data storing method according to the first embodiment of the present invention.

FIG. 3B schematically illustrates the operations of the L2P table by the data storing method according to the first embodiment of the present invention. For example, after the process as shown in FIG. 2F is completed, the solid state drive 10 is suffered from an unexpected power failure. Once the solid state drive 10 is powered on again, the controlling unit 101 may confirm that the third block BLOCK_3 of the flash memory 105 is an old open block. Then, a power mark PM is added to the old open block by the controlling unit 101, and the old open block is set as a first close block. In addition, the last page PAA(1F) of the third block BLOCK_3 is retained by the controlling unit 101, and the power mark PM and all physical-to-logical data of the third block BLOCK_3 (P2L-data3+PM) are filled into the last page PAA(1F) of the third block BLOCK_3. Meanwhile, the third block BLOCK_3 is set as the first close block.

Then, an available block of the flash memory 105 (e.g. the first block BLOCK_1) is set as a new open block by the controlling unit 101. Then, all valid data in the first close block (i.e. the third block BLOCK_3) are written into the new open block (i.e. the first block BLOCK_1). Then, all valid data in the first close block (i.e. the third block BLOCK_3) are set as invalid data.

From the above discussions, once the solid state drive 10 is powered on again, the old open block is firstly set as the first close block, and then all valid data in the first close block are written into the new open block. That is, as shown in FIG. 3B, the data in the first close block (i.e. the third block BLOCK_3) are stored and forward to the new open block (i.e. the first block BLOCK_1). Consequently, by the data storing method according to the first embodiment of the present invention, after the solid state drive 10 is powered on again, the data in the first close block are not gradually damaged or lost. Of course, since no valid data are included in the first close block, the first close block may be erased at any time by the controlling unit 101.

Furthermore, even if the solid state drive 10 is suffered from an unexpected power failure during the process of copying the data from the first close block to the new open block, the data storing method of the present invention can still preserve the data integrity. By the data storing method of the present invention, a power mark PM is added to the old open block. Once the solid state drive 10 is powered on again, if any block with the power mark PM still contains valid data, the valid data need to be written into the new open block by the data storing method according to the first embodiment of the present invention.

Moreover, the valid data in the old open block may be originated from the host 12 or collected by the garbage collection process. In the data storing method according to a second embodiment of the present invention, the data in the old open block are classified into two groups. The data of the first group are originated from the host 12. The data of the second group are originated from the collected data in the garbage collection process.

Figure 4A:
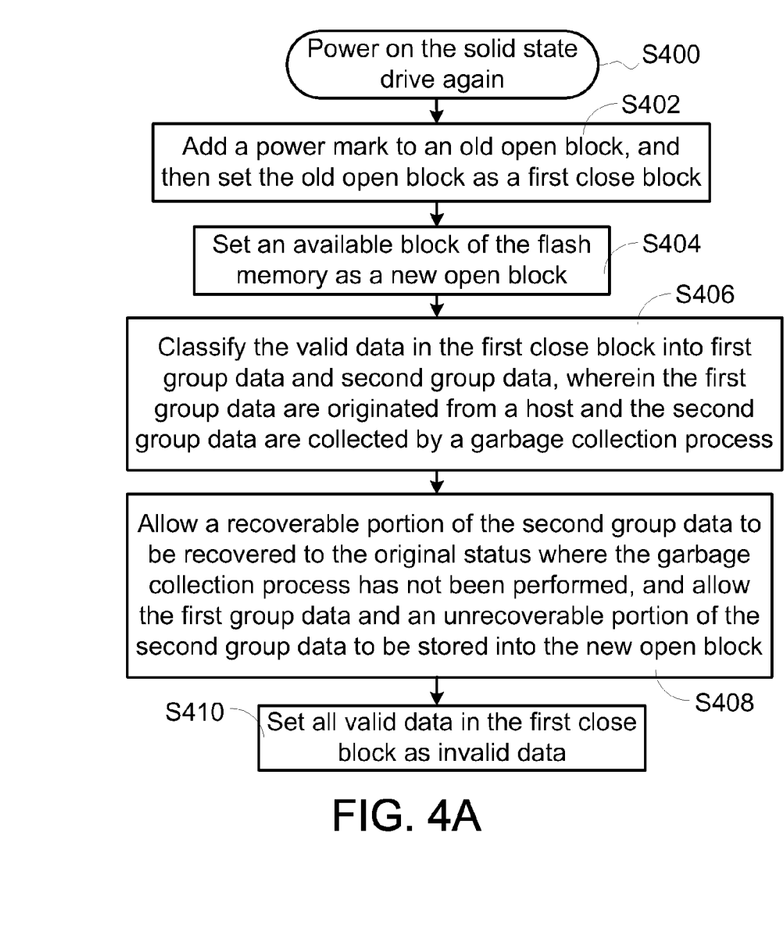
FIG. 4A is a schematic flowchart illustrating a data storing method according to a second embodiment of the present invention.

FIG. 4A is a schematic flowchart illustrating a data storing method according to a second embodiment of the present invention. Firstly, the solid state drive 10 is powered on again (Step S400). Then, a power mark PM is added to the old open block, and the old open block is set as a first close block (Step S402). Then, an available block of the flash memory 105 is set as a new open block (Step S404). Then, the valid data in the first close block are classified into a first group data and a second group data, wherein the first group data are originated from the host 12 and the second group data are collected by a garbage collection process (Step S406). Then, the recoverable portion of the second group data collected by the garbage collection process are recovered to the original status where the garbage collection process has not been performed, and the first group data and the unrecoverable portion of the second group data are written into the new open block (Step S408). Then, all valid data in the first close block are set as invalid data (Step S410).

Figure 4B:
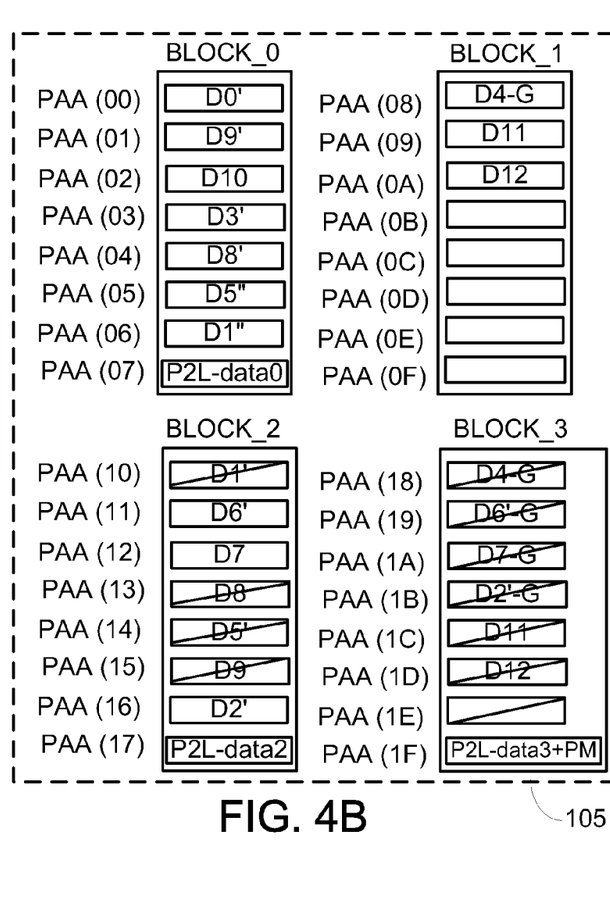
FIG. 4B schematically illustrates the operations of the L2P table by the data storing method according to the second embodiment of the present invention.

FIG. 4B schematically illustrates the operations of the L2P table by the data storing method according to the second embodiment of the present invention. For example, after the process as shown in FIG. 2F is completed, the solid state drive 10 is suffered from an unexpected power failure. Once the solid state drive 10 is powered on again, the controlling unit 101 may confirm that the third block BLOCK_3 of the flash memory 105 is an old open block. Then, a power mark PM is added to the old open block by the controlling unit 101, and the old open block is set as a first close block. In addition, the last page PAA(1F) of the third block BLOCK_3 is retained by the controlling unit 101, and the power mark PM and all physical-to-logical data of the third block BLOCK_3 (P2L-data3+PM) are filled into the last page PAA(1F). Meanwhile, the third block BLOCK_3 is set as the first close block. Then, an available block of the flash memory 105 (e.g. the first block BLOCK_1) is set as a new open block by the controlling unit 101.

In this embodiment, the valid data in the first close block are classified into first group data and second group data by the controlling unit 101, wherein the first group data are originated from the host 12 and the second group data are collected by the garbage collection process. Obviously, the data D4-G, D6'-G, D7-G and D2'-G in the third block BLOCK_3 are collected by the garbage collection process, and the data D11 and D12 are originated from the host 12. Although the source pages of the data D4-G, D6'-G, D7-G and D2'-G are marked as the invalid pages, if the blocks containing the invalid pages are not erased, the data in these invalid pages may be recovered to the original status where the garbage collection process has not been performed.

As shown in FIG. 4B, the source pages of the data D6'-G, D7-G and D2'-G are originated from the second block BLOCK_2, but the second block BLOCK_2 has not been erased. Consequently, the source pages PAA(11), PAA(12) and PAA(16) of the second block BLOCK_2 are recovered to the valid pages by the controlling unit 101, and the data D6'-G, D7-G and D2'-G are recovered to the valid data.

In other words, before the recoverable portion of the second group data is recovered to the original status, the recoverable data D6'-G, D7-G and D2'-G are stored into both of the first close block (third block BLOCK_3) and another close block (i.e. the second block BLOCK_2), and the data D6', D7 and D2' in the second block BLOCK_2 are set as invalid data. After the recoverable portion of the second group data is recovered to the original status, the data D6', D7 and D2' in the second block BLOCK_2 are set as the valid data again.

Moreover, the source page of the data D4-G is originated from the first block BLOCK_1. Since the first block BLOCK_1_has been erased after the garbage collection process is done, the data D4-G is not recoverable. Consequently, the unrecoverable portion of the second group data (i.e. the data D4-G) and the data D11 and D12 from the host 12 are written into the new open block (i.e. the first block BLOCK_1). Then, all data in the first close block (i.e. the third block BLOCK_3) are set as invalid data.

From the above discussions, once the solid state drive 10 is powered on again, the old open block is firstly set as the first close block, and then the valid data in the first close block are classified into first group data (originated from the host) and second group data (collected by the garbage collection process). Then, the recoverable portion of the second group data collected by the garbage collection process are recovered to the original status where the garbage collection process has not been performed, and the unrecoverable portion of the second group data and the first group data are written into the new open block. Consequently, by the data storing method according to the second embodiment of the present invention, after the solid state drive 10 is powered on again, the data in the first close block are not gradually damaged or lost.

Similarly, even if the solid state drive 10 is suffered from an unexpected power failure during the process of copying the data from the first close block to the new open block, the data storing method of the present invention can still preserve the data integrity. By the data storing method of the present invention, a power mark PM is added to the first close block. Once the solid state drive 10 is powered on again, if any block with the power mark PM still contains valid data, the valid data need to be further processed by the data storing method according to the second embodiment of the present invention.

From the above discussions, the present invention provides a data storing method for a solid state drive. Once the solid state drive is powered on again, all valid data in the old open block are stored into the new open block. Consequently, the data in the old open block can be instantly preserved. After the solid state drive is powered on again, the data in the old open block are not gradually damaged or lost.

Moreover, if all of the data in the old open block are valid data originated from the host, the data can be directly reserved by the data storing method according to the first embodiment of the present invention. If all of the data in the old open block are collected by the garbage collection process, the data can be directly reserved by the data storing method according to the second embodiment of the present invention, or the data can be directly reserved by the data storing method according to the first embodiment of the present invention.

It is noted that the solid state drive 10 can not judge whether the power failure is an unexpected power failure or a normal power failure made by the user. In the data storing method of the present invention, it is assumed that the power failure events are all unexpected power failure events. Once the solid state drive 10 is powered on again, all valid data in the old open block can be effectively preserved by the data storing method of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data storing method for a solid state drive to preserve data integrity after a power failure, the solid state drive having a flash memory with plural blocks, each block comprising plural pages, one of the plural blocks being set as an old open block, the data storing method comprising steps of:

powering on the solid state drive again;

adding a power mark to the old open block, and then setting the old open block as a first close block;

setting an available block of the flash memory as a new open block;

allowing valid data in the first close block to be stored into the new open block; and setting valid data in the first close block as invalid data.

2. The data storing method as claimed in claim 1, wherein after the solid state drive is powered on again, if the first close block with the power mark still contains valid data, the data storing method further comprises a step of allowing all valid data in the first close block to be stored into the new open block.

3. The data storing method as claimed in claim 1, wherein all valid data in the old open block include a first group data and a second group data, wherein the first group data are originated from a host and the second group data are collected by a garbage collection process.

4. The data storing method as claimed in claim 1, wherein all valid data in the old open block are either originated from a host or collected by a garbage collection process.

5. A data storing method for a solid state drive to preserve data integrity after a power failure, the solid state drive having a flash memory with plural blocks, each block comprising plural pages, one of the plural blocks being set as an old open block, the data storing method comprising steps of:

powering on the solid state drive again;

adding a power mark to the old open block, and then setting the old open block as a first close block;

setting an available block of the flash memory as a new open block;

classifying the valid data in the first close block into a first group data and a second group data, wherein the first group data are originated from a host and the second group data are collected by a garbage collection process;

allowing a recoverable portion of the second group data to be recovered to an original status where the garbage collection process has not been performed;

allowing the first group data and an unrecoverable portion of the second group data to be stored into the new open block; and setting all valid data in the first close block as invalid data.

6. The data storing method as claimed in claim 5, wherein the recoverable portion of the second group data comprises a first data, wherein before the recoverable portion of the second group data is recovered to the original status, the first data is stored in both of the first close block and a second close block, and the first data in the second close block is set as an invalid data.

7. The data storing method as claimed in claim 6, wherein after the recoverable portion of the second group data is recovered to the original status, the first data in the second close block is set as a valid data.

* * * * *